(12) United States Patent
Wang

(10) Patent No.: US 7,037,361 B2
(45) Date of Patent: May 2, 2006

(54) DUST COLLECTOR WITH AN INBUILT CYCLONIC WATER FILTER

(76) Inventor: Donglei Wang, No. 1 Jinfeng Road, Tangjiawan Town, Xiangzhou District, Zhuhai City, Guangdong Province, P.R. (CN)

( * ) Notice: Subject to any disclaimer, the term of this patent is extended or adjusted under 35 U.S.C. 154(b) by 111 days.

(21) Appl. No.: 10/732,159

(22) Filed: Dec. 10, 2003

(65) Prior Publication Data

US 2004/0139711 A1  Jul. 22, 2004

(30) Foreign Application Priority Data

Dec. 11, 2002  (CN) .......................... 2002250378 U

(51) Int. Cl.
*B01D 47/02* (2006.01)
(52) U.S. Cl. .......................... 96/333; 96/348
(58) Field of Classification Search .................. 96/317, 96/321, 331, 333, 348; 55/459.1; 95/226, 95/271
See application file for complete search history.

(56) References Cited

U.S. PATENT DOCUMENTS

| | | | | | |
|---|---|---|---|---|---|
| 2,238,824 | A | * | 4/1941 | Ryner .......................... | 96/236 |
| 2,437,592 | A | * | 3/1948 | Brown .......................... | 96/317 |
| 3,331,194 | A | * | 7/1967 | Reed et al. .................... | 96/321 |
| 3,527,026 | A | * | 9/1970 | Mitsugi ........................ | 96/276 |
| 3,546,851 | A | * | 12/1970 | Hardison et al. ............. | 96/313 |
| 4,251,241 | A | * | 2/1981 | Bothun ........................ | 96/317 |
| 4,424,069 | A | * | 1/1984 | Chang .......................... | 96/237 |
| 5,078,759 | A | * | 1/1992 | Kira ............................. | 95/223 |
| 5,902,385 | A | * | 5/1999 | Willeke et al. ............... | 96/316 |
| 5,908,493 | A | * | 6/1999 | Krymsky ...................... | 96/333 |

* cited by examiner

*Primary Examiner*—Frank M. Lawrence
(74) *Attorney, Agent, or Firm*—Colin P. Cahoon; Carstens & Cahoon, LLP

(57) ABSTRACT

A dust collector with an inbuilt cyclonic water filter, comprising a cup-shaped dust collecting unit, a water filter, a fan, a dust passage, an air flow passage, incoming and outgoing air passages; wherein, the outlets of the water filter open into the inlet of the outgoing air passage, and the outlet of the outgoing air passage is separated from the incoming air passage, passes through the outer wall of the cup-shaped dust collecting unit and is connected to the air flow passage. In operation, dust-containing air enters the dust collecting unit via the incoming air passage at a tangent, and the air flow in the dust collecting unit is whirled downwards into the water of the water filter, thereby, the dust contained in the air is wet and left in the water, while purified air is discharged.

5 Claims, 2 Drawing Sheets

DUST COLLECTOR WITH AN INBUILT CYCLONIC WATER FILTER

BACKGROUND OF THE INVENTION

1. Technical Field

This invention relates to a dust collector, and more particularly, to a dust collector with an inbuilt cyclonic water filter.

2. Background of the Invention

A conventional dust collector usually filtrates dust with a cotton filter bag. Dust and air are sucked in the cotton bag, wherein larger dusts are left in the dust collect box, tiny dusts and air are discharged by the fan and returned indoors. Thus, it is easy to cause secondary pollution, and dust will enter into human lungs easily, doing harm to human health. When dust is dumped, it flies everywhere, and becomes new pollution sources.

SUMMARY OF THE INVENTION

The main object of the present invention is to provide a dust collector with an inbuilt cyclonic water filter, so as to absorb dust and purify the air.

The dust collector according to the present invention comprises:

a cup-shaped dust collecting unit having an outer shell and a cylindrical body installed centrally within said cup-shaped dust collecting unit, wherein said cylindrical body having an outer wall and an inner cavity;

a water filter comprising a breakwater and a filter bowl; wherein said breakwater and the filter bowl are matched with each other, a cut opening is made at one side of the breakwater, which forms the inlet of the water filter, at the other side of the breakwater, through holes are made, which form the outlets of the water filter;

a fan;

a dust passage;

an air flow passage;

an incoming air passage formed between the outer shell of said cup-shaped dust collecting unit and the outer wall of said cylindrical body; said incoming air passage has an inlet and an outlet, wherein said inlet is installed on the outer wall of said cup-shaped dust collecting unit and is connected to the dust passage of said dust collector, said outlet opens into the inlet of the water filter;

an outgoing air passage formed in the inner cavity of said cylindrical body;

wherein, the outlets of the water filter open into the inlet of the outgoing air passage, the outlet of the outgoing air passage is separated from the incoming air passage, passes through the outer wall of the cup-shaped dust collecting unit and is connected to the air flow passage of the dust collector.

With a water filter inbuilt, the dust-containing air enters the cup-shaped dust collecting unit via the incoming air passage at a tangent. The air flow in the cup-shaped dust collecting unit is whirled downwards into the water of the water filter. The dust-containing air is sucked into the water by negative pressure, generates air bubbles and is mixed with water. The dust contained in the air is wet and left in the water, while the purified air is discharged out of the dust collector. After working with the dust collector, the dust can be cleared by throwing the dirty water inside the water filter. The dust collector of the present invention has good working effect. Besides, the air discharged is clean, no pollution is caused, which will be good for environment protection.

DETAILED DESCRIPTION OF THE PREFERRED EMBODIMENTS

Figure 1:
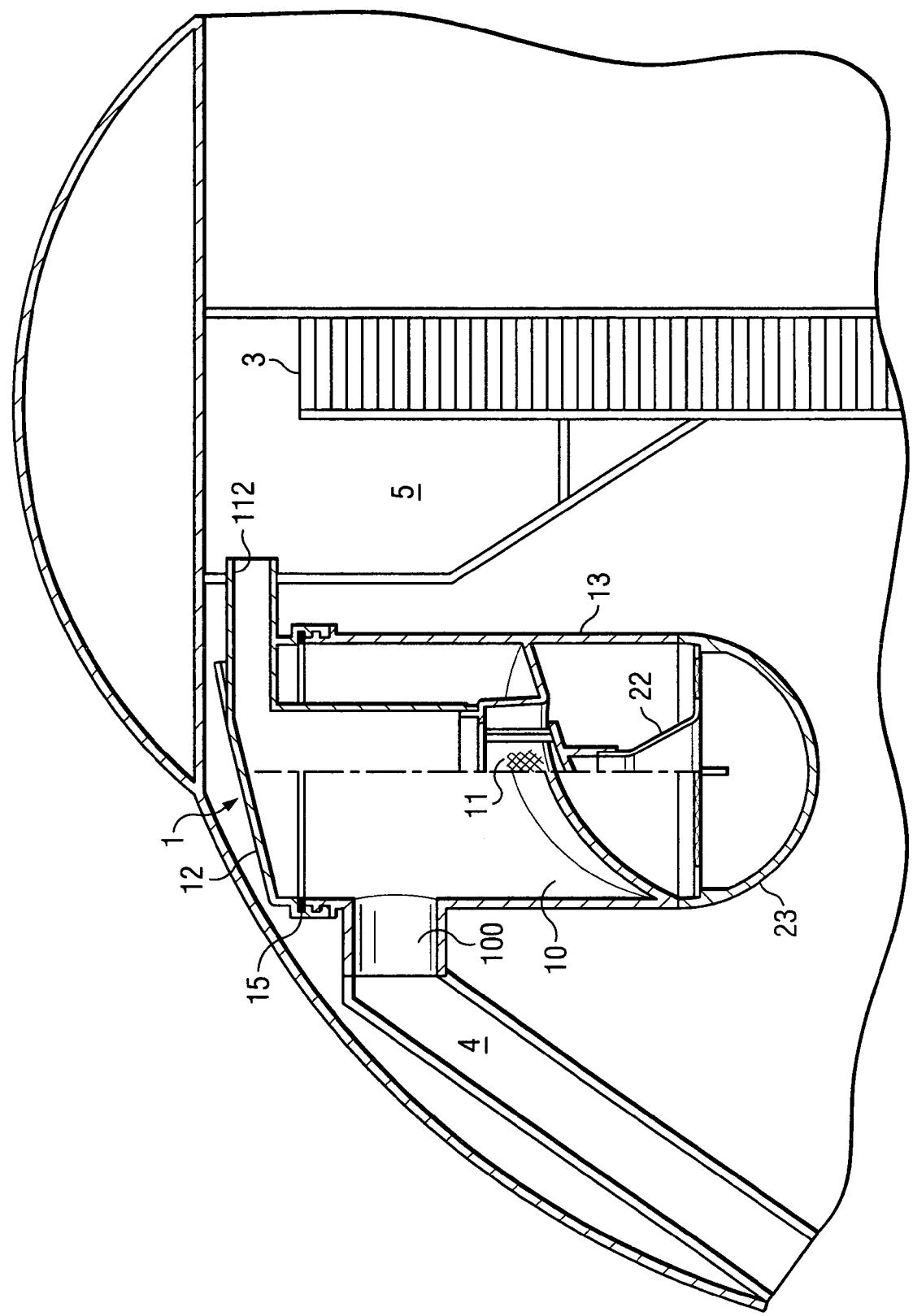
FIG. 1 is a schematic view of the dust collector according to the present invention.
Figure 2:
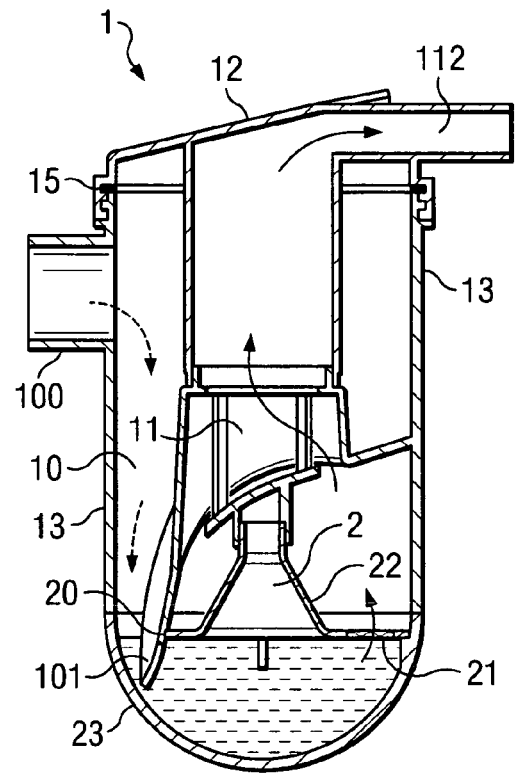
FIG. 2 is a schematic view illustrating the assembly of the cup-shaped dust collecting unit and the water filter of the dust collector shown in FIG. 1.

As shown in FIG. 1 and FIG. 2, the dust collector of the present invention comprises a cup-shaped dust collecting unit 1, a water filter 2 and a fan 3. Inside the dust collector, the outlet 101 of the incoming air passage 10 is connected to the inlet 20 of the water filter 2, the outlet 21 of the water filter 2 is connected to the inlet of the outgoing air passage 11, said incoming air passage 10 and outgoing air passage 11 are separate from each other.

Figure 3:
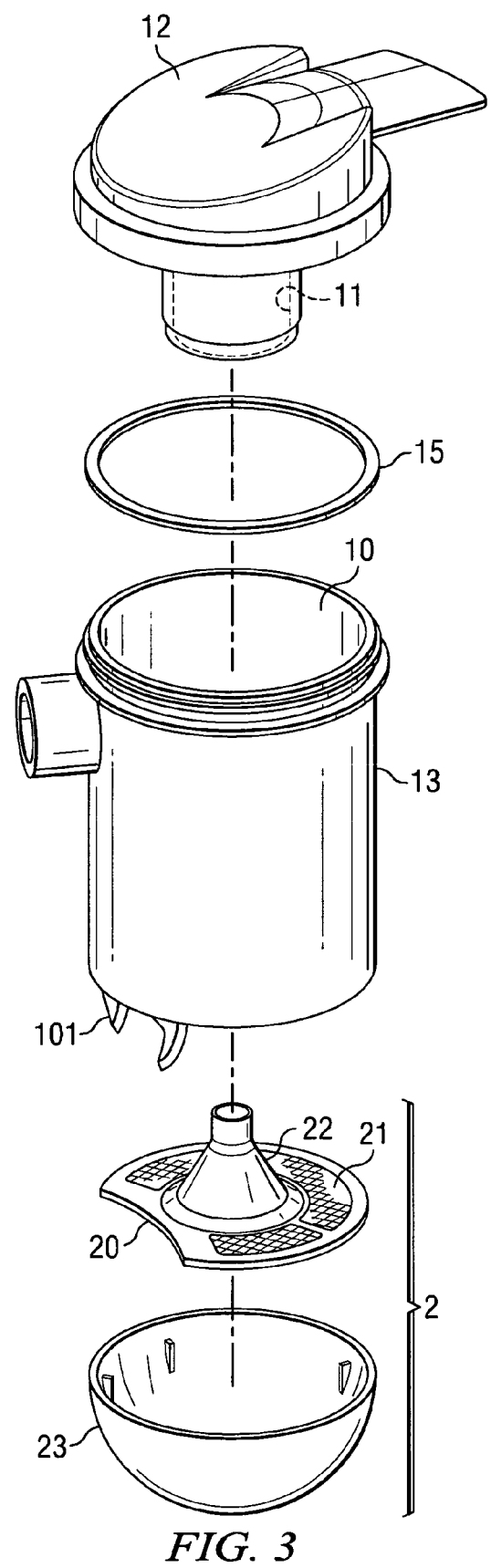
FIG. 3 is an explosive view of FIG. 2.

As shown in FIG. 2 and FIG. 3, the cup-shaped dust collecting unit 1 has a cylindrical body installed centrally. The cavity between the outer shell of said cup-shaped dust collecting unit 1 and the outer wall of said cylindrical body constructs the incoming air passage 10 of said cup-shaped dust collecting unit 1. The inner cavity of said cylindrical body constructs the outgoing air passage 11 of said cup-shaped dust collecting unit 1. The inlet 100 of the incoming air passage 10 is installed on the outer wall of said cup-shaped dust collecting unit, and is connected to the dust passage 4 of the dust collector. The outlet 101 of the incoming air passage 10 is connected to the inlet 20 of the water filter 2, the outlet 21 of the water filter 2 opens into the inlet of the outgoing air passage 11, the outlet 112 of the outgoing air passage 11 is separated from the incoming air passage 10, passes through the outer wall of the cup-shaped dust collecting unit and is connected to the air flow passage 5 of the dust collector.

The bottom of the cup-shaped dust collecting unit 1 is in the shape of a tilted and curved surface, at the bottom tip of which, the outlet 101 of the incoming air passage 10 enters into the water of the filter bowl 23 via the inlet 20 of the water filter 2.

The cup-shaped dust collecting unit 1 may comprise a cup body 13 and a upper lid 12, and be formed by connecting the cup body 13 and the upper lid 12 via screw, with rubber gasket 15 sealed in between. The cup body 13 is matched with the upper lid 12, thereby the outgoing air passage 11 is formed centrally within the cup-shaped dust collecting unit.

The water filter 2 comprises a breakwater 22 and a filter bowl 23. The breakwater 22 and the filter bowl 23 are matched with each other. A cut opening is made at one side of the breakwater 22, which forms the inlet 20 of the water filter. At the other side of the breakwater 22, through holes are made, which form the outlets 21 of the water filter 2.

The filter bowl 23 is in the shape of a semi-sphere.

The breakwater 22 comprises filter nets, a central member and a plastic frame. The filter nets of the breakwater 22 are secured to the plastic frame by means of over-molding. The filter bowl 23 has four reinforcement ribs. The breakwater 22 is positioned with the aid of the cylindrical body of the cup-shaped dust collecting unit 1 and the four reinforcement ribs of the filter bowl 23. The central member of the breakwater 22 is in the shape of a ringent trump, so as to block the writhing water sprays effectively. The air returned enters the top space of the cup body 13 via the outlets 21 at the brim of the breakwater 22.

The dust-containing air enters the transparent cylindrical cup body 13 via the inlet 100 at a tangent, and generates high speed turbulence. Since the air flow is of very high speed, static electricity generates due to the friction between the air flow and the inner wall. Thereby, some tiny dusts are absorbed and left on the inner wall of the cup body. Large dusts change from large particles to small ones along the curved surface, enter the water of the filter bowl 23 by high speed air flow. Thus, bubbles and sprays arise, dusts and water are mixed. Because of the function of inertia, large dusts deposit to the bottom of the water along the curved surface. Small dusts writhe along with the bubbles, hit the surface of the trump-shaped breakwater 22 and return to the water, and thus dilute more thoroughly. The few dusts taken to the filter net of the breakwater 22 by bubbles are broken by the small filter holes, thus, the contact area between the dust-containing air and the water is increased. The purified air enters the space constructed by the breakwater 22 and the tilted surface of the cup body 13, passes through the filter nets and outlets 21, enters the outgoing air passage 11 located centrally within the cup body 13 and the upper lid 12, passes through the fan 3, and finally is discharged and returned indoors.

What is claimed is:

1. A dust collector with an inbuilt cyclonic water filter comprising:
   a cup-shaped dust collecting unit (1) having an outer shell and a cylindrical body installed centrally within said cup-shaped dust collecting unit, wherein said cylindrical body has an outer wall and an inner cavity;
   a water filter (2) comprising a breakwater and a filter bowl; wherein said breakwater and the filter bowl are matched with each other, a cut opening is made at one side of the breakwater, which forms the inlet of the water filter, at the other side of the breakwater, through holes are made, which form the outlets of the water filter;
   a fan (3);
   a dust passage (4);
   an air flow passage (5);
   an incoming air passage (10) formed between the outer shell of said cup-shaped dust collecting unit and the outer wall of said cylindrical body; said incoming air passage has an inlet and an outlet, wherein said inlet is installed on the outer wall of said cup-shaped dust collecting unit and is connected to the dust passage of said dust collector, said outlet opens into the inlet of the water filter;
   an outgoing air passage (11) formed in the inner cavity of said cylindrical body;
   wherein, the outlets of the water filter open into the inlet of the outgoing air passage, the outlet of the outgoing air passage is separated from the incoming air passage, passes through the outer wall of the cup-shaped dust collecting unit and is connected to the air flow passage of the dust collector.

2. A dust collector according to claim 1, wherein the bottom of the cup-shaped dust collecting unit is in the shape of a tilted and curved surface, at the bottom tip of which the outlet of the incoming air passage enters into the water of the filter bowl via the inlet of the water filter.

3. A dust collector according to claim 1, wherein, said filter bowl is in the shape of a semi-sphere.

4. A dust collector according to claim 1, wherein, said cup-shaped dust collecting unit further comprises a cup body and an upper lid, said cup-shaped dust collecting unit is formed by connecting the cup body and the upper lid via screw, with a rubber gasket sealed in between; wherein said cup body is matched with the upper lid, thereby the outgoing air passage is formed centrally within the cup-shaped dust collecting unit.

5. A dust collector according to claim 1, wherein, said breakwater further comprises a filter net, a ringent trump shaped central member, and a plastic frame, wherein the filter net of the breakwater is secured to the plastic frame by means of over-molding; said filter bowl has four reinforcement ribs; and further wherein the breakwater is positioned with the aid of the cylindrical body of the cup-shaped dust collecting unit and the four reinforcement ribs of the filter bowl.

* * * * *